United States Patent [19]

Chao et al.

[11] 4,196,070
[45] Apr. 1, 1980

[54] METHOD FOR FORMING MICROPOROUS FLUOROCARBON POLYMER SHEET AND PRODUCT

[75] Inventors: Kwang C. Chao, Palo Alto; Mark C. Porter, Pleasanton, both of Calif.

[73] Assignee: Nuclepore Corporation, Pleasanton, Calif.

[21] Appl. No.: 859,559

[22] Filed: Dec. 12, 1977

[51] Int. Cl.$^2$ .............................................. B29D 27/00
[52] U.S. Cl. .................................. 204/266; 204/252; 204/296; 264/49; 264/127; 521/63
[58] Field of Search .............. 264/49, 127; 265/2.5 M; 204/266, 252, 296; 521/63

[56] References Cited

U.S. PATENT DOCUMENTS

| | | | |
|---|---|---|---|
| 2,846,727 | 8/1958 | Bechtold | 264/49 |
| 2,997,448 | 8/1961 | Hochberg | 264/49 X |
| 3,518,332 | 6/1970 | Sklarchuk et al. | 264/127 X |
| 3,700,627 | 10/1972 | Miller | 264/127 X |
| 3,930,979 | 1/1976 | Vallance | 204/296 X |
| 3,944,477 | 3/1976 | Argade | 204/296 X |
| 3,956,020 | 5/1976 | Weininger et al. | 429/254 |
| 3,980,613 | 9/1976 | Bachot et al. | 204/296 X |
| 4,003,818 | 1/1977 | Juillard et al. | 204/296 |
| 4,031,000 | 6/1977 | Hakamura et al. | 204/266 X |
| 4,089,758 | 5/1978 | McAloon | 204/296 X |
| 4,098,672 | 7/1978 | Riley | 204/296 |
| 4,111,866 | 9/1978 | Torikai et al. | 204/296 X |
| 4,156,639 | 5/1979 | Vallance et al. | 204/266 X |

FOREIGN PATENT DOCUMENTS

| | | | |
|---|---|---|---|
| 1364683 | 8/1974 | United Kingdom | 264/49 |
| 1410313 | 10/1975 | United Kingdom | 264/127 |

*Primary Examiner*—Philip Anderson
*Attorney, Agent, or Firm*—Flehr, Hohbach, Test, Albritton & Herbert

[57] ABSTRACT

A method for forming a microporous sheet of fluorocarbon polymer (e.g., polytetrafluoroethylene). An aqueous dispersion of polytetrafluoroethylene which includes a dissolved water-soluble, crystallizable metallic organic salt, preferably sodium benzoate, is formed into a sheet. Water is evaporated from an exposed surface of the sheet to grow crystals of the organic salt dispersed throughout the sheet. Then, the sheet is sintered. After cooling, the salt crystals are leached from the sheet by dissolution in water to leave a porous structure suitable for such uses as a filtration membrane or as a separation barrier in batteries or electrolytic cells.

27 Claims, 5 Drawing Figures

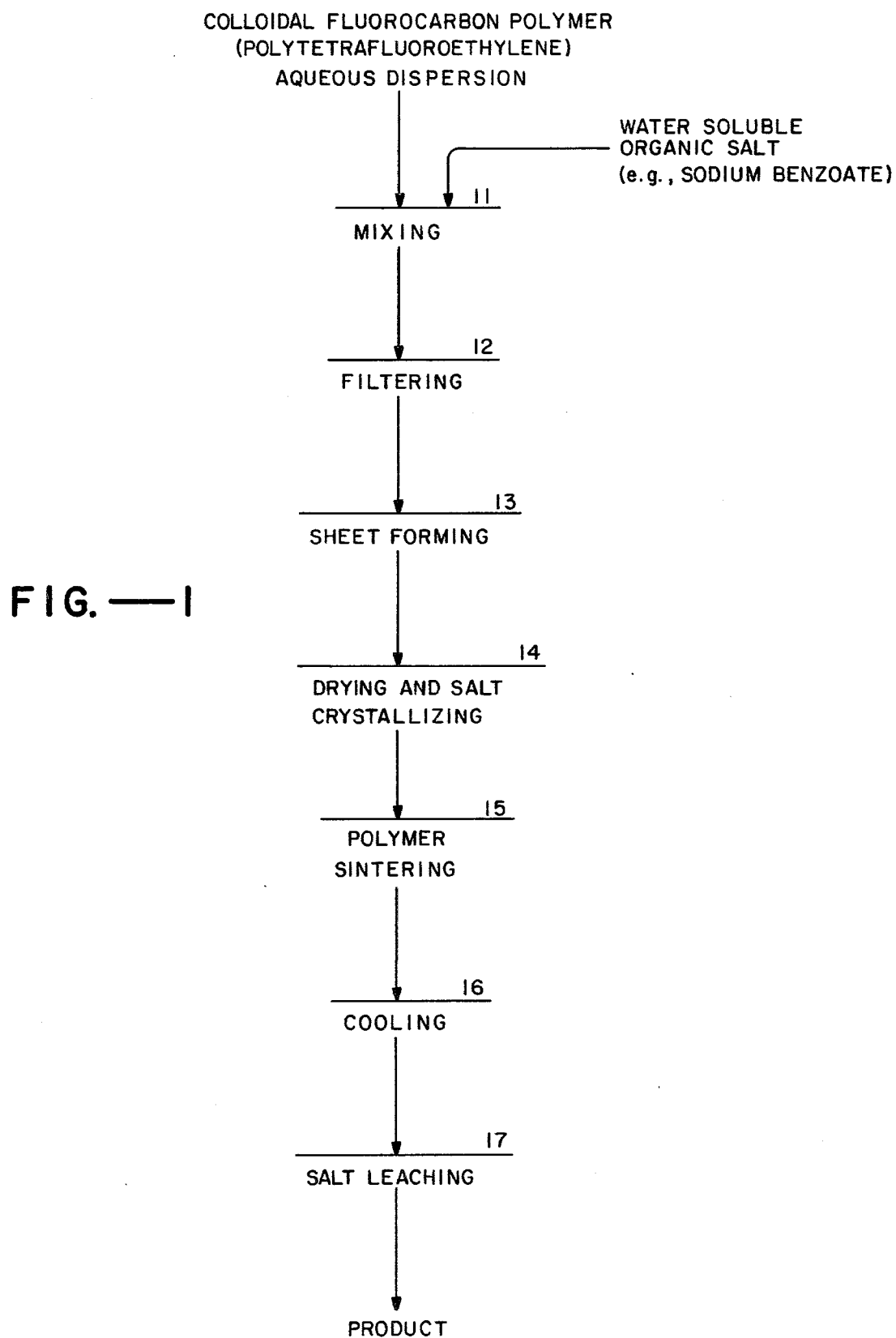

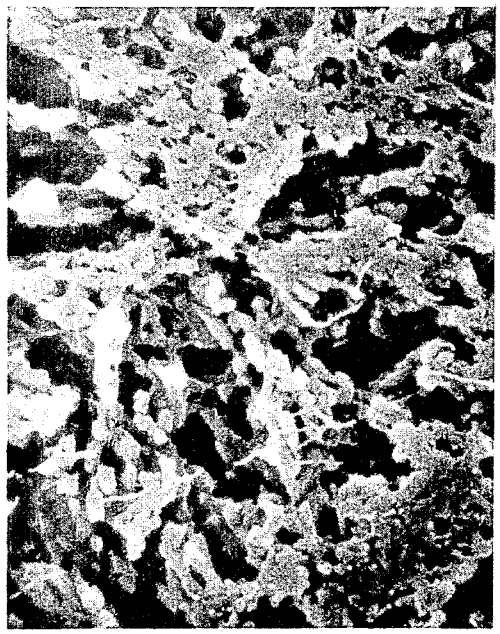
FIG. — 2
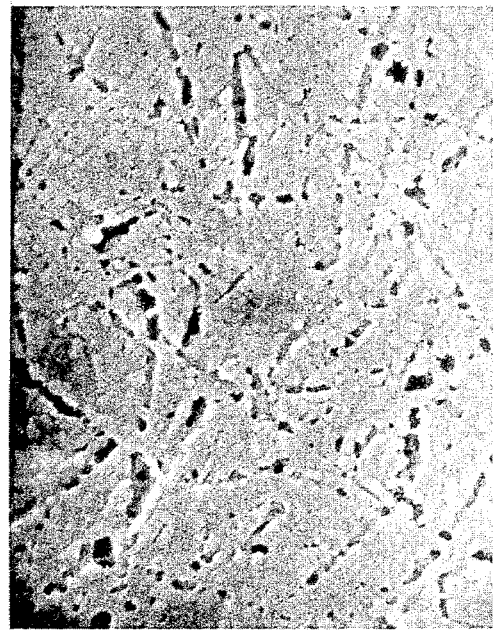
FIG. — 3
FIG. — 4
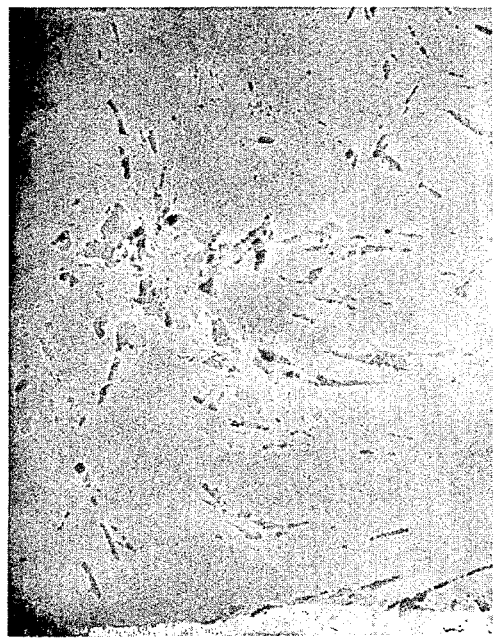
FIG. — 5

METHOD FOR FORMING MICROPOROUS FLUOROCARBON POLYMER SHEET AND PRODUCT

BACKGROUND OF THE INVENTION

Porous diaphragms have been formed of polytetrafluoroethylene sheets by a number of different methods. Such sheets are particularly useful in electrolytic cells and as a separator in a battery. In general, known methods for forming such sheets include dispersing solid particles in the sheets and then leaching the particles so that the resultant void space provides pores.

In one method of manufacture, described in U.S. Pat. No. 3,661,645, an aqueous dispersion of polytetrafluoroethylene is mixed with particles insoluble in water, such as zinc oxide, and pressed or cast into a film. After drying, the film is sintered to form a fused film with the zinc oxide particles distributed therein. Then, the pores are formed by leaching the particles from the film with an aqueous alkali.

In U.S. Pat. No. 3,859,402, another process is disclosed for forming microporous fluorocarbon polymer sheets. The polymer particles are mixed in the dry state with metallic inorganic salt particles, such as sodium chloride or calcium formate and compressed by rolling in dry form into a sheet. Then, the salt particles are removed by leaching with warm water.

In U.S. Pat. No. 3,890,417, a further process is disclosed in which an aqueous dispersion of polytetrafluoroethylene and a solid particulate additive are formed into a sheet. The disclosed additive is either a starch or a water-insoluble organic base or carbonate. After sheet formation, the additives are leached with an acid or base to form pores as in the foregoing process.

A major problem with microporous polytetrafluoroethylene sheets formed by such prior art techniques is their low tensile strength compared to the nonporous sheets. See, e.g., the discussion in U.S. Pat. No. 3,281,511. Such micropores are formed in the configuration of stacked regular crystal material having smooth planar surfaces. This is because the micropores are formed by leaching crystals which have been comminuted, typically along planar lines. It is believed that a sheet with micropores of this type of configuration produces a weak structure.

A further problem with prior methods is the lack of uniform porosity of the resulting sheets. Stacking of crystals in the pore matrix is necessary to form functional pores, i.e., ones that penetrate the sheet. Stacking would not occur uniformly throughout the sheet because of the difficulty in dispersing the solids crystal particles in stacks uniformly throughout the polymer matrix.

An additional problem with such prior art techniques is that the pore size is limited by the size of the pore-forming particles. It is known that submicron-size particles tend to agglomerate due to interparticle pores. Thus, the minimum pore size of the sheet is limited by this phenomena.

Another problem with such techniques is that the particles are not leached out until after the fluorocarbon sheets are sintered to increase their strength. During sintering the polymer can flow over and around the particles to completely encapsulate them. Since, the leaching solution can not reach the encapsulated particles, they remain in the final sheet. The polymer coating of the encapsulated particles is somewhat permeable, and so the particles are leaching in solution passing through the sheet during longterm use. This limits the useful areas of application for the microporous sheet. Another disadvantage of encapsulation is a reduction in porosity for a given loading of particles.

In the aforementioned U.S. Pat. No. 3,281,511, the process illustrated for forming microporous tetrafluoroethylene sheets is also time consuming. Fine polymer powder together with a carrier is mixed with particles of a filler material, such as sodium chloride, to form a dough. Such filler particles are not dissolved in the carrier. The patent states that the dough is rolled to biaxially orient the particles. Then the carrier is evaporated and the polymer sintered. The pores are formed by dissolving the filler material. The patent states that the structural strength of the sheet is improved by this orientation process. However, when this material is subjected to elevated temperature, the induced stress in the polymer sheet is relaxed. Upon cooling, the membrane would be subject to fracture. Also, during relaxation the polymer tends to plug the pores. Thus, the sheet formed by the disclosed process is not suitable for high temperature applications.

In British Pat. No. 1,364,683, another method is disclosed for the formation of a microporous diaphragm of polytetrafluoroethylene. In that method an inorganic filler, specifically barium sulfate, and a water-soluble salt, sodium chloride, are added to an aqueous dispersion of the polymer. The composition is rolled to form a membrane and dried. The membrane is then washed in water leaving the barium sulfate.

SUMMARY OF THE INVENTION AND OBJECTS

In accordance with the present invention, a microporous sheet of high tensile strength and uniform porosity is formed of fluorocarbon polymer, preferably polytetrafluoroethylene. An aqueous dispersion of the polymer particles is mixed with a water soluble, crystallizable metallic organic salt, preferably sodium benzoate, and formed into a sheet. The sheet is dried to form crystals of the salt dispersed throughout the sheet. Then, it is sintered to fuse the polymer particles and cooled. Thereafter, the salt crystals are leached out by dissolution in water. Microporous sheets formed by this method have small pores of generally dendritic configuration interlaced in a void space network of intersecting shafts with the sheet forming the negative image of such pores. The overall structure is sponge-like having an interconnecting porous network.

It is an object of the invention to provide an economical and rapid process for forming microporous fluorocarbon polymer sheets.

It is a specific object of the invention to provide such sheets with excellent tensile strength and flexibility.

It is a specific object of the invention to form such sheets of tetrafluoroethylene resin.

It is another object of the invention to provide a matte surface on only one side of the foregoing sheet to thereby provide unique fluid flow characteristics.

BRIEF DESCRIPTION OF THE DRAWINGS

FIG. 1 is a flow diagram of a method for forming a microporous fluorocarbon polymer sheet in accordance with the present invention.

FIG. 2 is a photomicrograph at 10,000 magnification of the matte surface exposed during drying of a polytetrafluoroethylene sheet formed according to the present invention by leaching of sodium benzoate.

FIG. 3 is a photomicrograph at 9,600 magnification of the smooth surface unexposed during drying of the sheet of FIG. 2.

FIG. 4 is a photomicrograph at 1,000 magnification of the matte surface of a polytetrafluoroethylene sheet formed according to the present invention by leaching sodium salicylate.

FIG. 5 is a photomicrograph at 1,000 magnification of the smooth unexposed surface of the sheet of FIG. 4.

DETAILED DESCRIPTION OF THE PREFERRED EMBODIMENTS

In general, the present invention relates to a method for forming a microporous fluorocarbon polymer sheet. Suitable fluorocarbon polymers include polytetrafluoroethylene, polytrifluoroethylene, polyvinylfluoride, polyvinylidenefluoride, polychlorotrifluoroethylene, polyfluoroethylenepropylene, polyperfluoroalkoxyethylene, and copolymers thereof. For simplicity of description, the specification will refer to the preferred fluorocarbon polymer, polytetrafluoroethylene.

Briefly summarized, the method of the present invention includes the following steps. In step 11, a water soluble metallic organic salt, preferably sodium benzoate, is mixed with a colloidal polytetrafluoroethylene aqueous dispersion. After filtering in step 12, the dispersion is formed into a sheet in step 13 and then dried in step 14 while simultaneously crystallizing the salt. Then, in step 15, the sheet is heated to sintering temperatures and cooled in step 16. In step 17, the salt crystals are leached from the sheet in water leaving a microporous structure. Then, the sheet is removed from the surface on which it is formed.

In mixing step 11, a colloidal dispersion of polytetrafluoroethylene particles is commercially available. One such product is supplied by duPont under the trademark "Teflon 30". Another suitable source is supplied by Imperial Chemical Industries under the trademark "Fluon GP-1" and "Fluon GP-1A". The size of the polymer particles in the dispersion is small enough so that the particles tend to remain dispersed rather than precipitate upon standing. A suitable size range for the polytetrafluoroethylene particles is from about 0.01 to about 10 microns and typically 0.15 to 0.2 microns.

There are other known factors which assist in maintaining a stable dispersion of the polytetrafluoroethylene. For example, stability is sensitive to the pH level of the dispersion. The preferred pH level is on the order of 10 to 11. Levels significantly above or below this level can cause precipitation. To further maintain the stability of the dispersion, a non-ionic surfactant is added such as one solid under the name "Triton 100" by Rohm & Haas.

Because of the presence of surfactant, during mixing the dispersion has a tendency to foam. Unless prevented, the bubbles produced during foaming would tend to form undesirable pin holes in the final film. Accordingly, an agent such as ethylene glycol may be added as a foam suppressant for the dispersion during mixing. A suitable range of such suppressant is on the order of from 1 cc. to 30 cc per 100 cc. of aqueous dispersion of polytetrafluoroethylene and preferably about 10 cc. per 100 cc. of dispersion. Ethylene glycol also serves as a viscosity increasing agent to assist casting.

A typical aqueous dispersion consists of 50–70% by weight of polytetrafluoroethylene, 30–50% by weight of water, and 5–10% by weight of a non-ionic surfactant. Such dispersion has a pH of between 10 and 11. For good stability, the particle size is normally between about 0.1 and 0.5 microns.

In mixing step 11, a salt which serves as a poreforming agent is mixed with the foregoing aqueous dispersion of polytetrafluoroethylene. The salt may be added to the polytetrafluoroethylene dispersion in particulate form or pre-dissolved in water. The agent consists essentially of a water-soluble crystallizable metallic organic salt. The salt should include the following characteristics: (1) sufficient solubility in water to be completely dissolved in the aqueous polytetrafluoroethylene dispersion prior to formation into a sheet; (2) a propensity to grow dendritic crystals in the drying environment of step 14; (3) an ability to grow a fine crystal size (e.g., below 1.0 micron) from a polytetrafluoroethylene dispersion; (4) stability at the temperature of sintering in step 15; and (5) a neutral or slightly alkaline pH in an aqueous dissociated state (to avoid precipitation of the polytetrafluoroethylene particles).

It has been found that an excellent and available poreforming agent which satisfies the foregoing requirements is an alkali metal salt of benzoic acid, preferably sodium benzoate. For similicity of description, sodium benzoate will be referred to herein as the specific poreformer. Other alkali metal salts may also be employed such as potassium or lithium benzoate. Other compounds in the class of alkali metal salts of aromatic acids may also be employed. For example, an alkali metal salt of salicylic acid, specifically sodium salicylate, also has been found to be effective.

The quantity of salt dissolved in the aqueous dispersion will determine the void space in the final product sheet. This in turn determines the porosity of the sheet. It is believed that higher concentrations of salt increases the pore size and the pore density of the final product. The concentration of sodium benzoate in the aqueous dispersion may be varied over a wide range depending upon the desired properties of the final product. For example, as low as one gram of salt per 100 cc. of aqueous dispersion up to the limit of solubility of the salt may be employed. For example, solutions of 10 to 40 grams of sodium or lithium benzoate, sodium salicylate, or lithium citrate per 100 cc. of dispersion may be employed.

In step 12, it is preferable to filter the mixed product of step 11 to form a highly uniform and homogeneous aqueous dispersion. The filter pore size would be large enough to permit passage of the polymer particles but small enough to block larger contaminants which may be entrained in the system.

In step 13, the filtered homogeneous dispersion of polytetrafluoroethylene is cast into a sheet as by deposition onto a smooth substrate such as a metal or glass plate. Conventional casting techniques include the use of a casting knife at a fixed dimension from the substrate maintained by runners at opposed sides of casting. The ultimate thickness of the film is determined by the desired end use. Typically, the blade is preset to cast the wet film at a thickness on the order of 2 to 10 mils. On drying, the film thickness for a typical solids concentration has been found to be on the order of 25 to 30% of the casting blade clearance.

In step 14, an exposed surface of the wet sheet is dried on the substrate to thereby grow crystals of the dissolved salt which are dispersed throughout the dried sheet. The rate of drying affects the fluid permeation characteristics of the final product by modifying the type of salt crystal growth and hence ultimate pore configuration. Specifically, an increase in the drying rate increases the number of pores and decreases the size of the same. The converse of this relationship in drying rate is also true. Generally, it has been found that nitrogen flows through films of the porous products with larger pores at a slower flow rate than through films with smaller pores. This is believed to be due to the presence of greater numbers of small pores.

For a moderate rate of drying, the top surface of the sheet may be left to dry in an air conditioned room at, say, 50% humidity and 75° F. At this rate, it takes on the order of 30 minutes to one hour to dry depending upon the thickness of the sheet. Alternatively, the sheet may be dried, say, at 190° F. as on a hot plate in about 10 minutes. For a slow rate of drying, the cast membrane may be freeze-dried prior to sintering. However, even though the slower rate of crystallization can produce larger pore size membranes, as mentioned above, the flow rates are often somewhat lower. This will depend on the number of crystals and their surface volume ratio.

In step 15, the dried sheet of salt containing polytetrafluoroethylene is subject to sintering to cause an interparticle bonding of the polymer to increase its structural strength. Preferably, the temperature of sintering is above the melting point of the polytetrafluoroethylene, about 327° C. Sintering may be carried out in a high temperature oven. It takes on the order of 1.5 hours to heat the film to a suitable sintering temperature of say 385° C. The sheet is then maintained at that temperature to assure that essentially all portions of the sheet has reached the same temperature. A suitable time for this purpose is on the order of 5 to 30 minutes. It is noted that the temperature must be below the decomposition point of the salt. For example, it is preferable to maintain the temperature below about 425° C. when using sodium benzoate.

In step 16, the sheet is permitted to cool, say, to room temperature. During this time, the sheet may remain on the glass or metal substrate. The rate of cooling determines the crystallinity of the polytetrafluoroethylene in the final product. For example, a fast cooling rate such as by quenching in air produces relatively low crystallinity and a small fibril structure. A slower cooling rate of say 20° C./hour to 60° C./hour provides high crystallinity. Low crystallinity provides improved tensile elongation and longer flex life. High crystallinity provides lower residual stress, improved dimensional stability, and lower permeability.

In step 17, the salt crystals are leached from the cool sheet by aqueous medium, suitably water, and the formed aqueous solution is removed from the sheet. This step is suitably performed by dipping the plate into a water bath maintained at a suitable temperature up to its boiling point. Since the salt is more soluble at elevated temperatures, the speed of the leaching step may be increased by using a hot water bath.

After leaching, the film is peeled from the underlying substrate and thereafter dried. Drying may be accomplished on a commercial basis with an air knife. Alternatively, the film may be first peeled from the substrate and subsequently leached. However, leaching while the film is on the substrate is preferred because it significantly reduces adhesion.

The fluorocarbon polymer sheet formed in accordance with the foregoing process, particularly one formed of polytetrafluoroethylene, is characterized by high chemical resistance and high temperature inertness. In addition, such microporous sheet is characterized by a high tensile strength and flexibility and also uniform flow characteristics when employed as a membrane. Thus, the sheet is particularly useful as a diaphragm or separator in an electrolytic cell such as the chlor-alkali cell, a fuel cell, or a battery, as a microfilter or ultra-filter, as a breathable water barrier, in blood oxygenation, as an artificial vein or artery and in a variety of other applications.

The technique of the present invention produces a unique microporous sheet consisting essentially of polytetrafluoroethylene. There is no necessity for remnants in the final product of any other additives present during processing. The pores are dispersed throughout the sheet. The structure of individual pores and their interrelationship in the sheet render it uniquely different from other microporous sheets as illustrated below.

Referring to the photomicrograph of FIG. 2 taken at 10,000 magnification, the rough or matte top surface of a microporous polytetrafluoroethylene sheet is illustrated which is the one formed by exposure to the surrounding environment during drying. The ligther color comprises the solid portion of the sheet while the darker comprises the pores or voids. The specific product was formed from a mixture including 25 grams of sodium benzoate per 100 cc. of polytetrafluoroethylene (type GP-1A) aqueous colloidal dispersion to which 10 cc. of ethylene glycol had been added. The sheet is dried at 160° C. to 7 mil in thickness. Referring again to FIG. 2, it is apparent that the pores are interconnected within the bulk of the membrane and are interlaced and intertwined into a void network of intersecting shafts forming a matte surface. Of course, this means that the salt crystals grew into the sheet as dendritic crystals. It is further apparent from FIG. 2 that the pores are interlaced or intertwined into a void network of intersecting shafts forming a matte surface. The solid portion of the sheet forms the negative image of the dendritic pores.

Referring to FIG. 3, the smooth bottom or unexposed surface of the sheet of FIG. 2 is illustrated in a photomicrograph at 9,600 magnification. It is apparent that the pore size and total void space is significantly smaller on the smooth bottom surface than on the rough matte surface. This is highly desirable for many applications such as ultra-filtration. In cross-flow ultra-filtration, an asymmetric membrane of this type is usually orinted that the finer pores are facing the process stream to prevent internal fouling of the membrane. In straight through flow applications, such as the chloro-alkali cell, the life of the membrane may be extended by orienting the membrane with the matte side (larger pores) upstream to provide more dirt loading capacity within the depth of the membrane.

It is apparent from these figures that the void space network on the surface continues downwardly into the interior of the sheet forming intertwined pore paths. This provides a three-dimensional labyrinthic network or maze for passage of fluids to provide excellent filtration properties of the sheet.

Referring to FIG. 4, a photomicrograph taken at 1,000 magnification is illustrated of the rough or matte top surface of a microporous polytetrafluoroethylene sheet formed generally in the manner of the sheet of FIGS. 2 and 3 with a substitution of sodium salicylate for sodium benzoate. The specific product was formed from an aqueous dispersion including 70 grams sodium salicylate per 100 cc. of polytetrafluoroethylene (type GP1-A) aqueous colloidal dispersion to which 10 cc. of ethylene glycol was added. FIG. 5 is the bottom smooth surface of the sheet of FIG. 4. It is apparent that the sheet of FIGS. 2 and 3 is similar in appearance to the sheet of FIGS. 4 and 5. One possible distinction is that the smooth bottom side of the former sheet appears to be somewhat more uniform in pore distribution than the same side of the latter sheet.

Due to the mechanism of crystal growth, essentially all of the pores are open to the rough matte surface of the sheet so that essentially none of the salt is encapsulated by the polytetrafluoroethylene polymer. Thus, the microporous sheet product consists essentially of the polymer without extraneous material. This can be explained as follows. Crystal growth occurs by evaporation of the water during step 14 to a sufficient extent that the salt becomes supersaturated in the remaining water. Such salt concentration occurs first at the surface of the sheet exposed to the air. Then, crystallization proceeds from this surface supersaturated solution into the interior of the sheet. Thus, essentially all of the salt crystals of any size grow from the exposed matte side into the sheet, and so are exposed to the water during leach step 17 for removal. This is to be contrasted with the prior art techniques in which solid particles are dispersed throughout a sheet of polytetrafluoroethylene followed by fusion of the sheet.

Freeze-drying may also be employed as a crystallization technique. The pore former crystallizes along with the water during the freezing step. The water is subsequently sublimed starting at the exposed surface until all the water is removed. This technique produces a somewhat different pore structure than crystallization by evaporation due to the fact that the crystallization occurs prior to removal of the water phase. It is similar to crystallization by evaporation in that the pore former crystsllizes out in the liquid phase prior to crystallization of the water.

A product of the present invention is characterized by high tensile strength, e.g., on the order of from 1400 to 1800 psi. or higher. Also, it is characterized by exceptionally high elongation, on the order of 200 to 500% or more. In addition, it is believed that the matte configuration of the microporous sheet formed of intertwined pores of dendritic configuration lends considerable structural strength to the product in comparison to the structure formed by imbedding soluble crystal particles in the sheet and leaching the same to form pores. Unexpectedly, it has been found that the microporous polytetrafluoroethylene sheet of the present invention is a continuous structure essentially free of the cracking which is characteristic of microporous sheets formed by prior art processing.

Since the sintering operation is neither under compression nor tension, the membrane obtained has an essentially negligible residue stress. This low residual stress membrane is not subject to significant dimensional change at elevated temperatures. This permits application at elevated temperatures up to the melting point of the polymer itself.

A suitable microporous sheet includes a porosity void volume to a total of from 20% to 60% of the entire sheet. In addition, it is characterized by a maximum pore size of no greater than 0.5 to 1.0 micron and a median pore size less than 0.1 micron due to the relatively small size of the crystals grown under the conditions of the present process.

The porous membranes of the present invention is particularly suitable for use as a separator between the anolyte and catholyte compartments in an electrolytic cell such as a conventional chlor-alkali cell. It has been found that operating at a current density on the order of 1.5 amperes per square inch, current efficiencies from 30% to over 60% are obtainable.

A further disclosure of the nature of the present invention is provided by the following specific examples of the practice of the invention. It should be understood that the data disclosed serve only as examples and are not intended to limit the scope of the invention.

EXAMPLE 1

| Formulation: | |
|---|---|
| 10 cc | Ethylene Glycol |
| 20 gm | Sodium Benzoate |
| 100 cc | Polytetrafluoroethylene aqueous dispersion (Fluon GP-1A from Imperial Chemical, Inc.) |

A film of the above formulation was cast with a 7 mil blade on a glass plate and dried at room temperature. The assembly was sintered in an oven at 700° F. for twenty (20) minutes. Then, the temperature was lowered to 300° F. and the assembly was removed from the oven for further cooling to room temperature. The salt was leached with water for three (3) minutes. A porous membrane with approximately 2 mil thickness was obtained.

The membrane was slit into 30 mm wide strips. The tensile properties were measured on a tensile tester with a jaw separation of 2 inches and speed of jaw separation at 2 inches per minute. The properties were as follows:

| | Tensile Strength at Break | Elongation |
|---|---|---|
| Casting Direction | 1800 psi | 510% |
| Cross Casting Direction | 1600 psi | 500% |

EXAMPLE 2

| Formulation: | |
|---|---|
| 10 gm | Sodium Benzoate |
| 5 gm | Sodium Chloride |
| 100 cc | Polytetrafluoroethylene aqueous dispersion (Fluon GP-1A) |
| 10 cc | Ethylene Glycol |

The procedure was identical to Example 1. The tensile properties were as follows:

| | Tensile Strength at Break | Elongation |
|---|---|---|
| Casting Direction | 1600 psi | 170% |
| Cross Casting Direction | 1400 psi | 210% |

It is apparent from a comparison of Examples 1 and 2 that the introduction of an inorganic salt results in a significant reduction in tensile strength and elongation. It was further found that increasing the concentration of inorganic salt caused a further reduction in the tensile strength.

EXAMPLE 3

The procedure of Example 1 was followed with only sodium chloride as the pore forming agent. Dried mud-like cracks appeared on drying which resulted in a significant decrease in structure integrity of the sheet.

EXAMPLE 4

The next two examples illustrate the effect of salt concentration and drying conditions on pore size and density.

| Formulation: | |
|---|---|
| 35 gm | Sodium Benzoate |
| 100 cc | Polytetrafluoroethylene aqueous dispersion ("Teflon 30" from DuPont Co.) |
| 10 cc | Ethylene Glycol |

The above formulation was cast with a 7 mil doctor blade on a smooth glass plate and allowed to dry at a constant controlled temperature (73° F.) and humidity (50%) environment. About thirty-five (35) minutes was sufficient. Then the entire assembly was placed in the oven as in Example 1. The resultant membrane had a nitrogen flow rate of 60 ml/min/cm$^2$ at 10 psig pressure differential. The porous membrane was further tested with the bubble point method as outlined by ASTM E-128. The method determined the maximum pore size of a porous structure.

The maximum pore size determined with the above method proved to be 0.58 micron with a median pore size of 0.075 micron.

EXAMPLE 5

| Formulation: | |
|---|---|
| 22 gm | Sodium Benzoate |
| 100 cc | Polytetrafluoroethylene aqueous dispersion (Fluon GP-1A) |
| 10 cc | Ethylene Glycol |

The above homogeneous dope was used to cast a 7 mil wet membrane on a smooth glass plate. The glass plate was put on a hot plate at 180° F. The film dried in about three (3) minutes and the entire assembly was put in the sintering oven as in the above example. Subsequent leaching and drying yielded a membrane with a nitrogen flow rate of 100 ml/min (at 10 psig pressure differential). The bubble point testing proved the maximum pore size to be 0.47 micron and with a median pore size of 0.10 micron.

It is apparent that the membrane of Example 4 had a larger maximum pore size and a broader pore size distribution than the membrane of Example 5.

EXAMPLE 6

| Formulation | |
|---|---|
| 35 gm | Sodium Benzoate |
| 100 gm | PTFE (Fluou GP-1A) |

The above dope was gently mixed to dissolve the salt while avoiding formation of air bubbles or gelation of the PTFE particles. The cast was completely frozen in about 10 minutes. Then the frozen z cast was placed into a freeze-dryer unit at −45° C. to vacuum dry for 8 hours. The freeze-dried cast was sintered in an oven. The resultant membrane had 1.2 mil thickness and a nitrogen flow rate at 10 psig of 400 mil/min/cm$^2$.

EXAMPLE 7

To the formulation of Example 6, 10 cc of ethylene glycol was added to reduce the tendency of foaming. The casting solution was warmed to 50° C. and film cast with a doctor blade at 5 mil setting onto a hot glass plate at 70° C. The film dried after two minutes in an open environment and was sintered as described above. The resultant film had a thickness of 1.3 mil and has a nitrogen flow rate at 10 psig of 200 mil/min/cm$^2$.

EXAMPLE 8

A microporous PTFE membrane prepared according to Example 1 was used as a separator in a laboratory chlor-alkali cell. The anode was titanium mesh coated with a noble metal oxide. The cathode was a perforated steel plate. The microporous PTFE was used as an electrolytic separator and was placed between the anode and cathode. Sodium chloride brine, 320 gpl, was fed to the anolyte compartment and flowed through the electrolytic separator into the cathode compartment. A current density of 1.5 ampere per square inch was applied to the electrodes. Chlorine was produced at the anode and hydrogen gas and sodium hydroxide was produced at the cathode. The anolyte compartment was equipped with a hydrostatic head so that brine continually flowed through the separator during the course of the experiment. The catholyte compartment contained an overflow so that the sodium hydroxide produced in the cell could be collected. The amount of sodium hydroxide produced over a 16 hour period of time was used to calculate the current efficiency. The chlorine produced was vented to a scrubber and the hydrogen produced was vented to an exhaust system. The cell operated at about 85° C. The cell operated for five days. The cell voltage was 3.66 and the current efficiency was 40% at 166 gpl NaOH.

EXAMPLE 9

A microporous PTFE membrane prepared according to Example 2 was used as a separator in the same chlor-alkali cell as described in Example 6. The cell operated for three days. The cell voltage was 3.91 and the current efficiency was 48.5% at 152 gpl NaOH.

EXAMPLE 10

A microporous PTFE membrane prepared according to Example 5 was used as a separator in the same chlor-alkali cell as described in Example 6. The cell operated for seven days. The cell voltage was 3.17 and the current efficiency was 31% at 98.9 gpl NaOH.

What is claimed is:

1. In a method for forming a microporous fluorocarbon sheet membrane, the steps of:
   (a) mixing an aqueous dispersion of fluorocarbon polymer with a pore-forming agent comprising a watersoluble crystallizable metallic organic salt, the crystal of said salt being stable at the sintering point of said fluorocarbon polymer,
   (b) forming a wet sheet from said aqueous dispersion,
   (c) concentrating the aqueous dispersion to grow crystals of said dissolved organic salt dispersed through said sheet, (d) drying said crystal-containing sheet,
(e) sintering the dry sheet, and
(f) leaching the salt crystals from the sheet in an aqueous medium and removing the formed aqueous solution from the sheet.

2. The method of claim 1 in which drying in step (d) is by evaporation.

3. The method of claim 1 in which drying in step (d) is by freeze-drying under vacuum.

4. The method of claim 1 in which said fluorocarbon is selected from the group consisting of polytetrafluoroethylene, polytrifluoroethylene, polyvinylfluoride, polyvinylidenefluoride, polychlorofluoroethylene, polyfluoroethylenepropylene, polyperfluoroalkoxyethylene, and copolymers thereof.

5. The method of claim 1 in which said formed microporous sheet consists essentially of said fluorocarbon polymer.

6. The method of claim 1 in which said fluorocarbon polymer is polytetrafluoroethylene.

7. The method of claim 1 in which said metallic organic salt crystals grow in a dendritic configuration.

8. The method of claim 6 in which said dendritic crystals grow from said exposed surface inwardly into said sheet to form a gradation of dendritic crystal concentration from a maximum at the exposed surface to a minimum at the opposite surface of said sheet.

9. The method of claim 1 in which said pore forming agent consists essentially of said metallic organic salt.

10. The method of claim 1 in which said organic salt is an alkali metal salt of an aromatic acid.

11. The method of claim 10 in which the aromatic acid component of said metallic organic salt is selected from the group consisting of benzoic and salicylic acid.

12. The method of claim 10 in which said metallic aromatic acid salt comprises sodium benzoate.

13. The method of claim 1 in which said wet sheet is formed by casting.

14. A microporous fluorocarbon polymer sheet formed by the process of claim 1.

15. An electrolytic cell comprising an anolytic compartment, a catholyte compartment, and a membrane therebetween, said membrane comprising the microporous fluorocarbon polymer sheet as set forth in claim 14.

16. The electrolytic cell of claim 15 comprising a chlor-alkali cell.

17. A microporous continuous sheet consisting essentially of fluorocarbon polymer and including pores dispersed throughout said sheet, said pores being interlaced in a void space network of intersecting shafts forming a matte surface in a sponge-like configuration on at least one side of said sheet, said sheet forming the negative image of said pores.

18. The microporous sheet of claim 17 in which said pores are of dendritic configuration.

19. The microporous sheet of claim 17 in which said fluorocarbon polymer is selected from the group consisting of polytetrafluoroethylene, polytrifluoroethylene, polyvinylfluoride, ployvinylidenefluoride, polychlorofluoroethylene, polyfluoroethylenepropylene, polyperfluoroalkoxyethylene, and copolymers thereof.

20. The microporous sheet of claim 17 in which said sheet is characterized by a gradation of void space from a maximum at the matte surface to a minimum at the opposite side of said sheet.

21. The microporous sheet of claim 17 in which said fluorocarbon polymer is polytetrafluoroethylene.

22. The microporous sheet of claim 17 essentially free of internal stress.

23. The microporous sheet of claim 17 essentially free of internal cracks.

24. The microporous sheet of claim 17 characterized by a tensile strength of at least 1400 psi.

25. The microporous sheet of claim 17 characterized by average pore size of no greater than 1.0 microns.

26. An electrolytic cell comprising an anolytic compartment, a catholyte compartment and a membrane therebetween, said membrane comprising a microporous continuous sheet consisting essentially of fluorocarbon polymer and including pores dispersed throughout said sheet, said pores being interlaced in a void space network of intersecting shafts forming a matte surface in a sponge-like configuration on at least one side of said sheet, said sheet forming the negative image of said pores.

27. The electrolytic cell of claim 26 comprising a chlor-alkali cell.

* * * * *